US008097230B2

(12) United States Patent
Mesters et al.

(10) Patent No.: US 8,097,230 B2
(45) Date of Patent: Jan. 17, 2012

(54) PROCESS FOR THE MANUFACTURE OF CARBON DISULPHIDE AND USE OF A LIQUID STREAM COMPRISING CARBON DISULPHIDE FOR ENHANCED OIL RECOVERY

(75) Inventors: Carolus Matthias Anna Maria Mesters, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 420 days.

(21) Appl. No.: 12/307,505

(22) PCT Filed: Jul. 5, 2007

(86) PCT No.: PCT/EP2007/056784
§ 371 (c)(1),
(2), (4) Date: Jan. 5, 2009

(87) PCT Pub. No.: WO2008/003732
PCT Pub. Date: Jan. 10, 2008

(65) Prior Publication Data
US 2009/0312202 A1 Dec. 17, 2009

(30) Foreign Application Priority Data

Jul. 7, 2006 (EP) .................................. 06116866

(51) Int. Cl.
*C01B 31/26* (2006.01)
(52) U.S. Cl. ........................................ 423/443
(58) Field of Classification Search .................. 423/443
See application file for complete search history.

(56) References Cited

U.S. PATENT DOCUMENTS

| | | | |
|---|---|---|---|
| 2,330,934 A | 10/1943 | Thacker et al. | 23/206 |
| 2,492,719 A | 12/1949 | Thacker et al. | 23/206 |
| 2,636,810 A | 4/1953 | Marisic et al. | 23/206 |
| 2,670,801 A | 3/1954 | Sherborne et al. | 166/21 |
| 3,087,788 A | 4/1963 | Porter et al. | 23/181 |
| 3,345,135 A | 10/1967 | Kerr et al. | 23/206 |
| 3,366,452 A | 1/1968 | Lauer | 23/204 |
| 3,393,733 A | 7/1968 | Kuo et al. | 166/8 |
| 3,402,768 A | 9/1968 | Felsenthal et al. | 166/2 |
| 3,498,378 A | 3/1970 | Stone et al. | 166/263 |
| 3,581,821 A | 6/1971 | Ross | 166/245 |
| 3,647,906 A | 3/1972 | Farley | 260/683 |
| 3,672,448 A | 6/1972 | Hoyt | 166/245 |
| 3,724,553 A | 4/1973 | Snavely, Jr. et al. | 166/304 |
| 3,729,053 A | 4/1973 | Froning | 166/304 |
| 3,754,598 A | 8/1973 | Holloway, Jr. | 166/249 |
| 3,794,114 A | 2/1974 | Brandon | 166/249 |
| 3,805,892 A | 4/1974 | Haynes, Jr. | 166/245 |
| 3,822,748 A | 7/1974 | Allen et al. | 166/269 |
| 3,823,777 A | 7/1974 | Allen et al. | 166/266 |
| 3,840,073 A | 10/1974 | Allen et al. | 166/274 |
| 3,847,221 A | 11/1974 | Allen et al. | 166/274 |
| 3,850,245 A | 11/1974 | Allen et al. | 166/274 |
| 3,878,892 A | 4/1975 | Allen et al. | 166/267 |
| 3,927,185 A | 12/1975 | Meadow et al. | 423/443 |
| 4,008,764 A | 2/1977 | Allen | 166/266 |
| 4,057,613 A | 11/1977 | Meadow et al. | 423/443 |
| 4,094,961 A * | 6/1978 | Beavon | 423/564 |
| 4,122,156 A | 10/1978 | Kittrell et al. | 423/443 |
| 4,182,416 A | 1/1980 | Trantham et al. | 166/245 |
| 4,305,463 A | 12/1981 | Zakiewiez | 106/245 |
| 4,393,937 A | 7/1983 | Dilgren et al. | 166/272 |
| 4,476,113 A | 10/1984 | Young et al. | 424/161 |
| 4,488,976 A | 12/1984 | Dilgren et al. | 252/8.55 D |
| 4,543,434 A | 9/1985 | Chang | 585/310 |
| 4,550,779 A | 11/1985 | Zakiewicz | 166/248 |
| 4,822,938 A | 4/1989 | Audeh et al. | 585/324 |
| 4,963,340 A | 10/1990 | Audeh et al. | 423/444 |
| 4,999,178 A | 3/1991 | Bowman | 423/571 |
| 5,065,821 A | 11/1991 | Huang et al. | 166/245 |
| 5,076,358 A | 12/1991 | Kissel | 166/275 |
| 5,082,642 A | 1/1992 | Bickar et al. | 423/402 |
| 5,120,935 A | 6/1992 | Nenniger | 392/305 |
| 5,211,923 A | 5/1993 | Harkness et al. | 423/220 |
| 5,607,016 A | 3/1997 | Butler | 166/263 |
| 5,609,845 A | 3/1997 | Cimini et al. | 423/648.1 |
| 5,803,171 A | 9/1998 | McCaffery et al. | 166/245 |
| 5,826,656 A | 10/1998 | McGuire et al. | 166/305.1 |
| 6,136,282 A | 10/2000 | Fisher | 423/220 |
| 6,149,344 A | 11/2000 | Eaton | 405/128 |
| 6,241,019 B1 | 6/2001 | Davidson et al. | 166/249 |
| 6,405,797 B2 | 6/2002 | Davidson et al. | 166/249 |
| 6,497,855 B1 | 12/2002 | Wachs | 423/648.1 |
| 6,506,349 B1 | 1/2003 | Khanmamedov | 423/210 |
| 6,706,108 B2 | 3/2004 | Polston | 106/285 |
| 6,851,473 B2 | 2/2005 | Davidson | 166/263 |
| 2001/0008619 A1 | 7/2001 | Geus et al. | 423/230 |

(Continued)

FOREIGN PATENT DOCUMENTS

EP 0581026 2/1994

(Continued)

*Primary Examiner* — Emily Le
*Assistant Examiner* — Brittany Martinez

(57) ABSTRACT

The invention provides a process for the manufacture of carbon disulphide by reacting carbon monoxide with elemental sulphur to form carbonyl sulphide and disproportionating the carbonyl sulphide formed into carbon disulphide and carbon dioxide, the process comprising contacting a gaseous stream comprising carbon monoxide with a liquid elemental sulphur phase containing a solid catalyst at a temperature in the range of from 250 to 700° C. to obtain a gaseous phase comprising carbonyl sulphide, carbon disulphide and carbon dioxide. The invention further provides the use of a liquid stream comprising carbon disulphide, carbonyl sulphide and carbon dioxide obtainable by such process for enhanced oil recovery.

12 Claims, No Drawings

U.S. PATENT DOCUMENTS

| | | | |
|---|---|---|---|
| 2002/0023538 A1 | 2/2002 | Agarwal et al. | 95/108 |
| 2002/0134706 A1 | 9/2002 | Keller et al. | 208/250 |
| 2003/0047309 A1 | 3/2003 | Thomas et al. | 166/265 |
| 2003/0194366 A1 | 10/2003 | Srinivas et al. | 423/230 |
| 2004/0016676 A1* | 1/2004 | Newton | 208/113 |
| 2004/0022721 A1 | 2/2004 | Watson et al. | 423/574.1 |
| 2004/0096381 A1 | 5/2004 | Watson et al. | 423/224 |
| 2004/0146288 A1 | 7/2004 | Vinegar et al. | 392/301 |
| 2004/0146450 A1 | 7/2004 | Stauffer | 423/443 |
| 2004/0159583 A1 | 8/2004 | Mesters et al. | 208/208 |
| 2004/0256097 A1 | 12/2004 | Byrd et al. | 166/901.1 |
| 2005/0189108 A1 | 9/2005 | Davidson | 166/249 |
| 2006/0254769 A1 | 11/2006 | Wang et al. | 166/266 |
| 2007/0251686 A1 | 11/2007 | Sirvrikoz et al. | 166/249 |
| 2008/0023198 A1 | 1/2008 | Hsu | 166/268 |
| 2008/0087425 A1 | 4/2008 | Hsu | 166/266 |

FOREIGN PATENT DOCUMENTS

| | | |
|---|---|---|
| GB | 1007674 | 10/1965 |
| GB | 1173344 | 12/1969 |
| GB | 2057412 | 4/1981 |
| GB | 2379685 | 3/2003 |
| WO | WO 9850679 | 11/1998 |
| WO | WO 2007131976 | 11/2007 |
| WO | WO 2007131977 | 11/2007 |
| WO | WO 2008003732 | 1/2008 |
| WO | WO2008034777 | 3/2008 |

* cited by examiner

PROCESS FOR THE MANUFACTURE OF CARBON DISULPHIDE AND USE OF A LIQUID STREAM COMPRISING CARBON DISULPHIDE FOR ENHANCED OIL RECOVERY

The present application claims priority of European Patent Application No. 06116866.2 filed 7 Jul. 2006.

FIELD OF THE INVENTION

The present invention provides a process for the manufacture of carbon disulphide and the use of a liquid stream comprising carbon disulphide, carbonyl sulphide and carbon dioxide obtainable by such process for enhanced oil recovery.

BACKGROUND OF THE INVENTION

Carbon disulphide is typically manufactured by reacting light saturated hydrocarbons with elemental sulphur that is in the vapour phase according to the reaction equation:

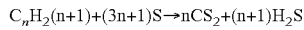
$$C_nH_2(n+1)+(3n+1)S \rightarrow nCS_2+(n+1)H_2S$$

In GB 1,173,344 for example is disclosed a process for reacting vapour phase sulphur and propane in the absence of a catalyst under a pressure not exceeding 10 atmospheres in a reaction zone which is maintained at a temperature of 550 to 850° C.

In U.S. Pat. No. 3,087,788 is disclosed a process for producing carbon disulphide from hydrocarbon gas and vaporous sulphur in a non-catalytic reaction stage combined with, preferably followed by, a catalytic reaction stage, wherein both stages are operated at a pressure between 2 and 20 atmospheres and a temperature between 400 and 750° C.

It is also known to manufacture carbon disulphide by catalytically reacting liquid sulphur with a hydrocarbon. In U.S. Pat. No. 2,492,719 for example is disclosed a process for preparing carbon disulphide, wherein a suspension of catalyst in molten sulphur is contacted with a hydrocarbon gas at a temperature of approximately 500 to 700° C., under sufficient pressure to maintain the sulphur in liquid phase.

A disadvantage of using hydrocarbons as a carbon source for the manufacture of carbon disulphide is that the hydrogen atoms in the hydrocarbon react with the elemental sulphur to form hydrogen sulphide. It would be advantageous to use a carbon source without hydrogen atoms for carbon disulphide manufacture.

Before 1960, solid carbonaceous material such as charcoal was used as carbon source for carbon disulphide manufacture. Solid carbonaceous material was contacted with vaporised elemental sulphur at very high temperatures. These processes using solid carbonaceous material were, however, replaced by the above-mentioned processes using light hydrocarbons such as methane and propane as carbon source for environmental and safety reasons.

It is known to use carbon monoxide as carbon source for carbon disulphide manufacture. In US 2004/0146450, for example, is disclosed a two-reactor process for the manufacture of carbon disulphide from carbon monoxide and sulphur dioxide. Two catalytic reactions are operated in tandem. In a first reactor, carbon monoxide and sulphur dioxide are reacted in the presence of a catalyst to form carbonyl sulphide and carbon dioxide. In a second reactor, the carbonyl sulphide formed in the first reactor is catalytically converted into carbon disulphide and carbon dioxide. Carbon disulphide is continuously removed from the second reactor by a solvent.

Also in U.S. Pat. No. 4,122,156, a two-reactor process for the manufacture of carbon disulphide from carbon monoxide and sulphur dioxide is disclosed.

Carbon disulphide is known to be a suitable solvent for enhanced oil recovery by miscible flooding. In enhanced oil recovery by miscible flooding, a solvent for oil is introduced into an oil reservoir and driven through the reservoir to increase oil recovery from the reservoir beyond what can be achieved by conventional means. In U.S. Pat. No. 3,847,221 for example, the use of carbon disulphide for enhanced oil recovery from tar sands is disclosed.

SUMMARY OF THE INVENTION

It has now been found that carbon disulphide can be manufactured from carbon monoxide as carbon source in a single reaction zone by reacting carbon monoxide with liquid elemental sulphur in the presence of a solid catalyst that is effective for disproportionating the carbonyl sulphide formed into carbon disulphide and carbon dioxide.

Accordingly, the present invention provides a process for the manufacture of carbon disulphide by reacting carbon monoxide with elemental sulphur, the process comprising contacting a gaseous stream comprising carbon monoxide with a liquid elemental sulphur phase containing a solid catalyst at a temperature in the range of from 250 to 700° C. to obtain a gaseous phase comprising carbonyl sulphide, carbon disulphide and carbon dioxide. It is expected that the reaction of the present invention comprises reaction of carbon monoxide and elemental sulphur to form carbonyl sulphide, followed by disproportionating the carbonyl sulphide formed into carbon disulphide and carbon dioxide.

An important advantage of the process according to the invention as compared to the conventional carbon disulphide manufacturing process using hydrocarbons as carbon source is that no hydrogen sulphide is formed that would have to be recycled to a Claus unit for conversion into sulphur.

An advantage of the process according to the invention as compared to the known carbon disulphide manufacture processes that use carbon monoxide as carbon source, i.e. the processes as disclosed in US 2004/0146450 and U.S. Pat. No. 4,122,156, is that it can be operated in a single reaction zone. Another advantage is that less carbon dioxide is co-produced. In the process according to the invention, one mole of carbon dioxide is co-produced with one mole of carbon disulphide, whereas in the processes of US 2004/0146450 and U.S. Pat. No. 4,122,156 five moles of carbon dioxide are co-produced with one mole of carbon disulphide.

The process according to the invention has particular advantages when operated in combination with the conversion of a hydrocarbonaceous feedstock into synthesis gas, i.e. a gaseous mixture mainly comprising carbon monoxide and hydrogen. Synthesis gas is typically produced for subsequent synthesis of hydrocarbons by the Fischer-Tropsch process, other chemical synthesis processes, power generation in gas turbines or for hydrogen production. Often, the carbon monoxide to hydrogen ratio in the synthesis gas is too large for the envisaged application and part of the carbon monoxide in the synthesis gas is then typically converted into hydrogen by subjecting the synthesis gas to water-gas shift conversion. Combining the process according to the invention with synthesis gas production has the advantage that part of the carbon monoxide is used for carbon disulphide manufacture, thereby decreasing the carbon monoxide to hydrogen ratio in the remaining synthesis gas to a more desirable level. Another advantage is that elemental sulphur is typically available at synthesis gas production locations, since the hydrocarbonaceous feedstock is typically desulphurised before gasification. A further advantage is that the hydrogen atoms of the hydrocarbonaceous compound are converted into valuable hydrogen. The carbon monoxide that is co-produced serves as a hydrogen-free feedstock for carbon disulphide manufacture and, thus, hydrogen sulphide formation is avoided.

DETAILED DESCRIPTION OF THE INVENTION

The gaseous phase comprising carbonyl sulphide, carbon disulphide and carbon dioxide obtained in the process according to the invention may be condensed to obtain a liquid stream comprising carbon disulphide. The gaseous phase may be condensed in such way that a liquid phase comprising carbonyl sulphide, carbon disulphide and carbon dioxide is obtained. Alternatively, separate liquid streams may be obtained by sequential partial condensation steps, i.e. a first liquid stream mainly comprising carbonyl sulphide and carbon dioxide and a second liquid stream mainly comprising carbon disulphide. The liquid stream comprising carbon disulphide, with or without carbonyl sulphide and carbon dioxide, may suitably be used for enhanced oil recovery.

In a further aspect, the invention further provides the use of a liquid stream comprising carbon disulphide, carbonyl sulphide and carbon dioxide obtainable by the process according to the invention for enhanced oil recovery.

In the process according to the invention, a gaseous stream comprising carbon monoxide is contacted with a liquid elemental sulphur phase at a temperature in the range of from 250 to 700° C. The liquid elemental sulphur phase contains a solid catalyst that is effective for catalysing disproportionation of carbonyl sulphide into carbon disulphide and carbon dioxide.

The liquid sulphur phase is contained in a reaction zone, typically a reactor vessel or tube, and contains solid catalyst. The solid catalyst may be contained in the liquid sulphur phase in any suitable way, for example as a fixed bed of catalyst particles, as a structured packing coated with catalyst, or as catalyst particles dispersed in the liquid sulphur phase.

By contacting the gaseous steam comprising carbon monoxide with the liquid sulphur phase, carbon monoxide reacts with elemental sulphur to form carbonyl sulphide according to:

$$2CO + 2S \rightarrow 2COS \quad (1)$$

The carbonyl sulphide is then disproportionated into carbon disulphide and carbon dioxide:

$$2COS \leftrightarrow CS_2 + CO_2 \quad (2)$$

For reaction (1), the thermodynamics are favourable in the sense that the equilibrium lies extremely towards the right. For a reaction temperature up to about 700° C., the equilibrium constant is well above 1 and, thus, complete or almost complete conversion will be achieved.

Disproportionation reaction (2) is a thermodynamically less favourable. It is a reversible reaction. Since the heat of reaction is close to zero, the equilibrium constant does not change much with temperature. Under the temperature and pressure conditions of the process according to the invention, up to almost 40% of the carbonyl sulphide may be disproportionated.

Both reactions (1) and (2) take place in the same reaction zone that contains both a liquid elemental sulphur phase and a solid catalyst immersed in that phase. The solid catalyst catalyses disproportionation reaction (2). Reaction (1) may also be catalysed by the catalyst. The solid catalyst may be any catalyst that is effective for catalysing disproportionation of carbonyl sulphide into carbon disulphide and carbon dioxide. Such catalysts are known in the art, for example from US 2004/0146450 and U.S. Pat. No. 4,122,156. Preferably, the catalyst comprises one or more metal oxides. Examples of suitable catalysts are alumina, titania, alumina-titania, silica-alumina, quartz, or clay, for example kaolin. The catalyst preferably has a specific surface area of at least 50 m2/g, more preferably at least 100 m2/g, even more preferably at least 200 m2/g. Particularly preferred catalysts are gamma-alumina, titania, alumina-titania, or silica-alumina.

In the process according to the invention the liquid elemental sulphur phase is kept at a temperature in the range of from 250 to 700° C. when the gaseous stream comprising carbon monoxide is contacted with it. At temperatures below 250° C., the high viscosity of the liquid sulphur phase would impede proper processing. Preferably, the temperature is in the range of from 300 to 500° C.

The process is carried out at a pressure sufficient to maintain a liquid elemental sulphur phase. Preferably, the pressure is in the range of from 3 to 200 bar (absolute), more preferably of from 5 to 100 bar (absolute), even more preferably of from 5 to 30 bar (absolute).

The process may be carried out in any reactor configuration suitable for contacting a gas with a liquid in the presence of a solid catalyst, for example a co-current or a counter-current fixed bed trickle flow reactor, a slurry bubble column, or an ebullating bed reactor.

The gaseous stream comprising carbon monoxide is preferably supplied to the liquid sulphur at such velocity that the contact time of carbon monoxide with liquid sulphur is in the range of from 0.1 to 200 seconds. Since elemental sulphur is consumed during the process, the contact time decreases over time if no make-up elemental sulphur is supplied to the reactor during the process. Make-up sulphur may be continuously supplied to the reactor during the process. Alternatively, elemental sulphur is batch-wise supplied to the reactor after a certain period on stream.

The gas weight velocity of the gaseous stream is preferably such that the hourly rate of carbon monoxide supplied to the catalyst is in the range of from 10 to 1000 liters carbon monoxide (at conditions of standard temperature and pressure) per kilogram catalyst per hour. The amount of carbon monoxide in the gaseous stream may vary widely. Preferably the amount of carbon monoxide is in the range of from 10 to 100 vol % based on the total volume of the gaseous stream. Examples of suitable gaseous streams comprising carbon monoxide are synthesis gas or hydrogen-depleted synthesis gas. Reference herein to hydrogen-depleted synthesis gas is to synthesis gas from which part of the hydrogen has been removed, for example by pressure swing absorption or membrane separation.

Preferably, the gaseous stream comprising carbon monoxide is hydrogen-depleted synthesis gas. Typically, hydrogen-depleted synthesis gas is obtained by first partially oxidising a hydrocarbonaceous feedstock to obtain synthesis gas comprising carbon monoxide and hydrogen and then separating at least part of the hydrogen from the synthesis gas. Preferably, the synthesis gas or hydrogen-depleted synthesis gas is obtained from a carbon-rich hydrocarbonaceous feedstock, i.e. a hydrocarbonaceous feedstock with a hydrogen-to-carbon atomic ratio below 1. Examples of such carbon-rich hydrocarbonaceous feedstocks are coal, tar sand derived bitumen, residuum obtained by vacuum distillation of crude oil or by vacuum distillation of tar sand derived bitumen.

In the process according to the invention, a gaseous phase comprising carbonyl sulphide, carbon disulphide and carbon dioxide is obtained. Preferably, the gaseous phase is at least partly condensed to obtain a liquid stream comprising carbon disulphide. The carbon disulphide may be condensed together with the carbonyl sulphide and the carbon dioxide. Alternatively, in sequential partial condensation steps, the carbonyl sulphide and carbon dioxide are first condensed in a first condensation step and the carbon disulphide is then condensed in a second condensation step. Thus, a relatively pure stream of liquid carbon disulphide is obtained. Purification steps other than condensation may also be applied in order to obtain a liquid stream comprising carbon disulphide with the desired composition.

It will be appreciated that the desired composition of the liquid stream comprising carbon disulphide will determine the condensation and/or purification steps needed. For the conventional applications of carbon disulphide, for example its use as raw material for rayon production or as solvent, a high purity of carbon disulphide is desired. If the liquid stream is used for enhanced oil recovery, i.e. for injecting it in an oil reservoir for increasing the oil production from that reservoir, the liquid carbon disulphide stream may comprise substantial amounts of carbonyl sulphide and carbon dioxide.

The liquid stream comprising carbon disulphide that is formed in the process according to the invention is particularly suitable to be used in enhanced oil recovery, since the liquid stream typically comprises components other than carbon disulphide that do not need to be removed for this application. Therefore, the process according to the invention preferably further comprises injecting the liquid stream comprising carbon disulphide into an oil reservoir for enhanced oil recovery. The liquid stream comprising carbon disulphide may be mixed with other liquid components or streams before being injected into the oil reservoir.

Typically, the liquid stream comprising carbon disulphide obtainable by the process according to the invention will also comprise carbonyl sulphide and carbon dioxide. The invention therefore further provides the use of a liquid stream comprising carbon disulphide, carbonyl sulphide and carbon dioxide obtainable by the process according to the invention for enhanced oil recovery. Preferably, the use of a liquid stream having carbon disulphide in a concentration in the range of from in the range of from 10 to 90 vol %, carbonyl sulphide in a concentration in the range of from 5 to 80 vol %, and carbon dioxide in a concentration in the range of from 5 to 20 vol % based on the total volume of the liquid stream.

EXAMPLES

The process according to the invention will be further illustrated by means of the following non-limiting examples.

Example 1

According to the Invention

A reactor tube (inner diameter 12 mm) was filled with 15 grams liquid sulphur and a catalyst bed of 7.1 grams gamma alumina trilobes (diameter 1.3 mm; length/diameter/ratio 3) with a specific surface area of 300 g/m². A gaseous stream consisting of 85.5 vol % nitrogen and 14.5 vol % carbon monoxide was bubbled through the reactor tube at a rate of 3.9 normal liters per hour and at a pressure of 10 bar (absolute) during 60 seconds. In different experiments, the reactor tube was kept at different temperatures (270-420° C.). The composition of the gaseous reactor effluent was analysed by means of gas chromatography. In Table 1, the total conversion of carbon monoxide and the conversion of carbon monoxide to carbon disulphide is shown. In all experiments, the disproportionation reaction, i.e. conversion of carbonyl sulphide into carbon disulphide and carbon dioxide, reached thermodynamic equilibrium.

TABLE 1

Experiments with catalyst (EXAMPLE 1)

| experiment | T (° C.) | CO conversion (%) | CO conversion to $CS_2$ (%) |
|---|---|---|---|
| 1 | 270 | 74 | 14 |
| 2 | 320 | 98 | 17 |
| 3 | 370 | 100 | 18 |
| 4 | 420 | 100 | 18 |

Example 2

Comparative Example

A reactor tube (inner diameter 12 mm) was filled with 32 grams liquid sulphur. The reactor tube contained no catalyst. A gaseous stream consisting of 80 vol % nitrogen and 20 vol % carbon monoxide was bubbled through the reactor tube at a rate of 3.0 normal liters per hour and at a pressure of 10 bar (absolute) during 50 seconds. In different experiments, the reactor tube was kept at different temperatures (370-520° C.). The composition of the gaseous reactor effluent was analysed by means of gas chromatography. In Table 2, the total conversion of carbon monoxide and the conversion of carbon monoxide to carbon disulphide is shown.

TABLE 2

Experiments without catalyst (EXAMPLE 2)

| experiment | T (° C.) | CO conversion (%) | CO conversion to $CS_2$ (%) |
|---|---|---|---|
| 5 | 370 | 10 | 0.03 |
| 6 | 420 | 30 | 0.04 |
| 7 | 520 | 98 | 0.3 |

The results show that reaction (1), i.e. the conversion of carbon monoxide into the carbon disulphide and carbon dioxide also takes place in the absence of a catalyst, although a higher temperature is needed for complete conversion. Disproportionation reaction (2) does hardly take place in the absence of a catalyst.

That which is claimed is:

1. A process for the manufacture of carbon disulphide by reacting carbon monoxide with elemental sulphur, the process comprising contacting a gaseous stream comprising carbon monoxide with a liquid elemental sulphur phase containing a solid catalyst at a temperature in the range of from 250 to 700° C. and a pressure in the range of from 3 to 100 bar (absolute) to obtain a gaseous phase comprising carbonyl sulphide, carbon disulphide and carbon dioxide.

2. The process according to claim 1, wherein the solid catalyst comprises a metal oxide.

3. The process according to claim 1, wherein the gaseous stream comprising carbon monoxide is contacted with the liquid elemental sulphur phase at a temperature in the range of from 300 to 500° C.

4. The process according to claim 1, wherein the gaseous stream comprising carbon monoxide is hydrogen-depleted synthesis gas.

5. The process according to claim 4, wherein the hydrogen-depleted synthesis gas is obtained by partially oxidising a hydrocarbonaceous feedstock with an hydrogen-to-carbon atomic ratio below 1 to obtain synthesis gas comprising carbon monoxide and hydrogen; and then separating at least part of the hydrogen from the synthesis gas.

6. The process according to claim 1, further comprising condensing at least part of the gaseous phase comprising carbonyl sulphide, carbon disulphide and carbon dioxide to obtain a liquid stream comprising carbon disulphide.

7. The process according to claim 6, further comprising injecting the liquid stream comprising carbon disulphide into an oil reservoir for enhanced oil recovery.

8. The process of claim 7, wherein the liquid stream comprising carbon disulphide comprises carbon disulphide in a concentration from 10 to 90 vol %, carbonyl sulphide from 5 to 80 vol %, and carbon dioxide from 5 to 20 vol %.

9. The process according to claim 1, wherein the solid catalyst comprises a metal oxide selected from the group consisting of alumina, titania, alumina-titania, and silica-alumina.

10. The process according to claim 1, wherein the gaseous stream comprising carbon monoxide is contacted with the liquid elemental sulphur phase containing a solid catalyst at a pressure in the range of from 5 to 30 bar (absolute).

11. The process according to claim 5, wherein the hydrocarbonaceous feedstock is coal, tar sand derived bitumen, residuum from vacuum distillation of crude oil or residuum from vacuum distillation of tar sand derived bitumen.

12. The process of claim 7 wherein the liquid comprising carbon disulphide further comprises carbonyl sulphide and carbon dioxide.

* * * * *